United States Patent
El-Damhougy

(10) Patent No.: US 7,742,425 B2
(45) Date of Patent: Jun. 22, 2010

(54) NEURAL NETWORK-BASED MOBILITY MANAGEMENT FOR MOBILE AD HOC RADIO NETWORKS

(75) Inventor: Hesham El-Damhougy, Tustin, CA (US)

(73) Assignee: The Boeing Company, Chicago, IL (US)

( * ) Notice: Subject to any disclaimer, the term of this patent is extended or adjusted under 35 U.S.C. 154(b) by 1007 days.

(21) Appl. No.: 11/426,417

(22) Filed: Jun. 26, 2006

(65) Prior Publication Data

US 2007/0299946 A1    Dec. 27, 2007

(51) Int. Cl.
*H04B 7/14* (2006.01)

(52) U.S. Cl. .................. 370/241; 370/315; 370/328; 370/338; 370/401; 455/525; 709/223

(58) Field of Classification Search ............... None
See application file for complete search history.

(56) References Cited

U.S. PATENT DOCUMENTS

| | | | | |
|---|---|---|---|---|
| 5,297,232 A | * | 3/1994 | Murphy | 706/26 |
| 2003/0204625 A1 | * | 10/2003 | Cain | 709/243 |
| 2007/0268364 A1 | * | 11/2007 | Neff et al. | 348/143 |

* cited by examiner

*Primary Examiner*—Chi H. Pham
*Assistant Examiner*—Shick Hom
(74) *Attorney, Agent, or Firm*—Law Office of Charles W. Peterson, Jr.

(57) ABSTRACT

A self managed ad hoc communications network and method of managing the network. The network includes wireless devices or nodes that include a neural network element and the ad hoc network operates as a neural network. One of the nodes is designated as a Network Management System (NMS) that provides overall network management. Clusters of nodes are organized around cluster leaders. Each cluster leader manages a cluster of nodes and communications between node clusters. Each cluster may also have other nodes identified as lower order cluster leaders.

32 Claims, 7 Drawing Sheets

NEURAL NETWORK-BASED MOBILITY MANAGEMENT FOR MOBILE AD HOC RADIO NETWORKS

CROSS REFERENCE TO RELATED APPLICATION

The present invention is related to U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005; and to U.S. Pat. No. 7,555,468, "NEURAL NETWORK-BASED NODE MOBILITY AND NETWORK CONNECTIVTY PREDECTIONS FOR MOBILE AD HOC RADIO NETWORK," U.S. patent application Ser. No. 11/426,425, "NEURAL NETWORK-BASED MOBILITY MANAGEMENT FOR SELF-PARTITION DETECTION AND IDENTIFICATION OF MOBILE AD HOC RADIO NETWORKS," and U.S. patent application Ser. No. 11/426,428, "NEURAL NETWORK-BASED MOBILITY MANAGEMENT FOR HEALING MOBILE AD HOC RADIO NETWORKS," to Hesham El-Damhougy, filed coincident herewith, all four assigned to the assignee of the present invention and incorporated herein by reference.

BACKGROUND OF THE INVENTION

1. Field of the Invention

The present invention generally relates to an adaptable mobile communications networks and, more particularly, to an ad-hoc mobile network for adaptable wireless communications in an unstructured environment such as a tactical battlefield.

2. Background Description

Tactical radio communications rely heavily on mobile radio networks and systems that are continually changing while in use. Emerging tactical battlefield networks typically include a collection of mobile autonomous host nodes or terminals that support numerous mobile clients. Unlike a typical commercial mobile telephone network, for example, these mobile nodes are not connected together by fixed land based connections (e.g., hard wired), but continually move into and out of radio communication range with each other. Consequently, one generally cannot rely on a pre-defined fixed infrastructure within this type of environment. Moreover, the nodes may be destroyed, or new nodes may join the network. Thus, such a mobile, wireless network may be considered dynamically changing and so, infrastructure-less or "ad-hoc" in that the nodes and node locations dynamically change over time. As a result, the connectivity among the nodes may vary with time.

Since a typical wireless ad-hoc network lacks fixed communications nodes (e.g., base stations) to define the network, a group of autonomous nodes or terminals serve to define the network. The autonomous nodes form a decentralized multi-hop radio network and communicate with each other to maintain connectivity. Each node may represent radio communication devices that may be located with a person (such as a war-fighter), located on/in a ground or an air vehicles platform, e.g., an Unmanned Air Vehicle (UAV), and an Unmanned Ground Vehicles (UGV). As is typical with any network, such a wireless ad-hoc network can be represented graphically by a set of time varying vertices representing network nodes with edges between nodes that are capable of communicating with each other. So, at any particular time, for example, the network nodes may be represented as a set of points that indicate the node locations at that instant. A graph edge or line between two vertices indicates that the two nodes are connected, i.e., the corresponding nodes can reach each other (or communicate) by a radio link. So, each line represents a radio link between two communicating nodes. Two radio nodes are said to be communicating if the link quality is above a predefined threshold, e.g., where the signal-to-noise ratio (SNR) is above a predefined threshold. Nodes are communicating indirectly or through an indirect path in a path that passes through at least one intermediate node.

Normally, each mobile node in a wireless ad-hoc network can communicate at least with one or more neighboring mobile nodes that are a single radio hop away. Since, typically, the wireless ad-hoc network is operating in the absence of fixed radio relay base stations; each mobile node operates not only as a host but also as a router to relay communications from other connected nodes. Thus, the nodes are typically forwarding/relaying information packets between other mobile nodes in the wireless ad-hoc network that may not be within direct wireless transmission range of each other. So, network control is distributed among the nodes and each node participates in an ad-hoc routing protocol that allows it to discover "multi-hop" paths through the network to any other node.

Further, since the nodes are mobile, and because of node departures and additions, the network topology may change rapidly and unpredictably over time. Nodes can fail, for example, if they are destroyed or due to hard or soft failures which occur in the battlefield. Typical radio communication effects, such as noise, fading, and interference, can impede communications and prevent some nodes from connecting to others. Consequently, for reliable communications the wireless ad-hoc network must be able to compensate for variable link quality. Wireless propagation path loss, fading, multi-user interference, distance between nodes and signal strength variations can all affect connection quality. In addition, operating area/network topology losses can further interfere with communications. Changes in propagation conditions and the environment, such as inclement weather, and irregular terrain (e.g., interrupted by mountains and buildings), for example, can interfere with network communications. Thus, changes in propagation conditions and the environment, as well as the unpredictability of node movements and sporadic node failures, can contribute to the dynamic nature of an ad-hoc network. Further, when links between nodes break, the network can be split into isolated sub-networks. Such a break in the network can create a situation where some nodes cannot communicate with others, i.e., there are absolutely no direct or indirect paths between these nodes. In this case, the network is said to be "partitioned." These problems are even further complicated in a military environment where the preservation of security, latency, reliability, intentional jamming, and recovery from failure are significant concerns.

The Department of Defense (DOD) has instituted an initiative known as the Joint Tactical Radio System (JTRS) to provide a flexible new approach to meeting diverse warfighter communications needs through software-programmable tactical radio technology or "software defined radios (SDRs)." In particular, these SDRs are intended for voice, data and video communications across a battle-space. However, beyond the battlefield, the JTRS may have application for initiatives in areas as diverse as homeland security, Federal, state and local law enforcement, search and rescue, commercial aviation and international commercial applications. The JTRS implements the concept of relay and translation nodes (land, sea, air and space based) to help ensure that tactical users can access required information wherever it resides. To accomplish this, however, nodes must be able to communicate with each other in spite of links being broken frequently as nodes move, randomly fail, or are destroyed e.g., in enemy or unintentional attacks.

Accordingly, there is a need for an ad-hoc mobile network that can adapt well to link changes, and in particular to interconnectivity changes between ad-hoc mobile network nodes. Further, there is a need to maintain network-wide connectivity in ad-hoc networks, i.e., maintaining communication paths, either node-to-node or by multiple-node-hopping and routing, that allows any two nodes to maintain communication with one another.

SUMMARY OF THE INVENTION

An embodiment of the present invention includes a self managed ad hoc communications network and method of managing the network. The network includes wireless devices or nodes that include a neural network element and the ad hoc network operates as a neural network. One of the nodes is designated as a Network Management System (NMS) that provides overall network management. The NMS can either be at a fixed location node or incorporated with a mobile wireless node. Clusters of nodes are organized around cluster leaders. Each cluster leader manages a cluster of nodes and communications between node clusters. Each cluster may also have other nodes identified as lower order cluster leaders known as secondary or deputy cluster leaders.

Advantageously, a preferred ad hoc communications network is self-managing to adapt well to operating changes, and in particular to interconnectivity changes between preferred nodes. After initially identifying hierarchically organized network leaders, cluster nodes reorganize themselves and change cluster leaders as the situation requires. Further, a preferred ad hoc communications network optimizes node connectivity to maintain network-wide connectivity in spite of node and connection changes. New nodes can be easily inserted or added (such as unmanned air or ground vehicles) to maintain network wide connectivity, and the loss of a node does not always require reconfiguring the network to maintain communication.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1A:
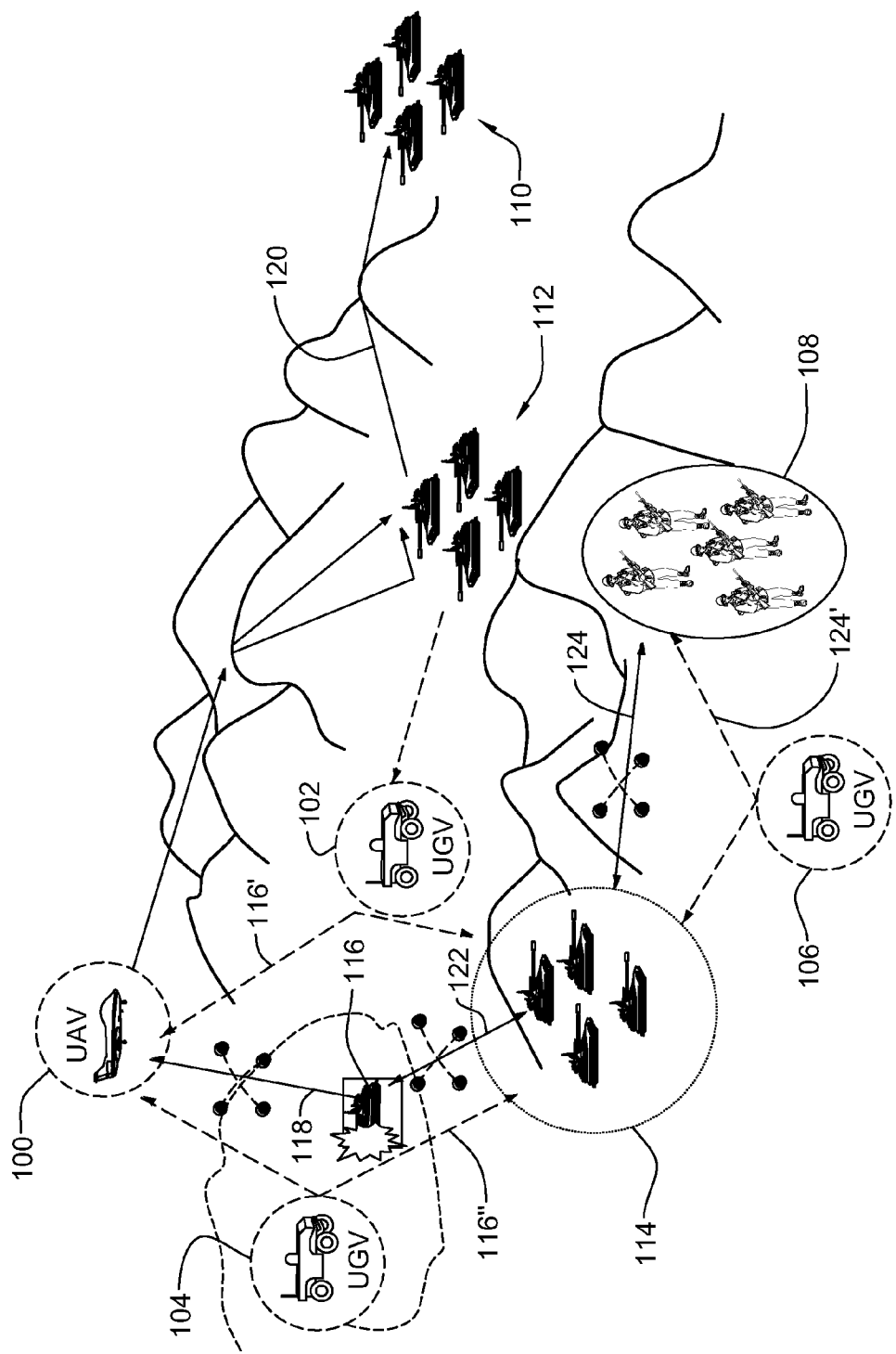
FIGS. 1A-C show a battlefield example of an ad hoc hierarchical mobile communications network and graphical representations of the battlefield example according to an advantageous embodiment of the present invention.
Figure 1B:
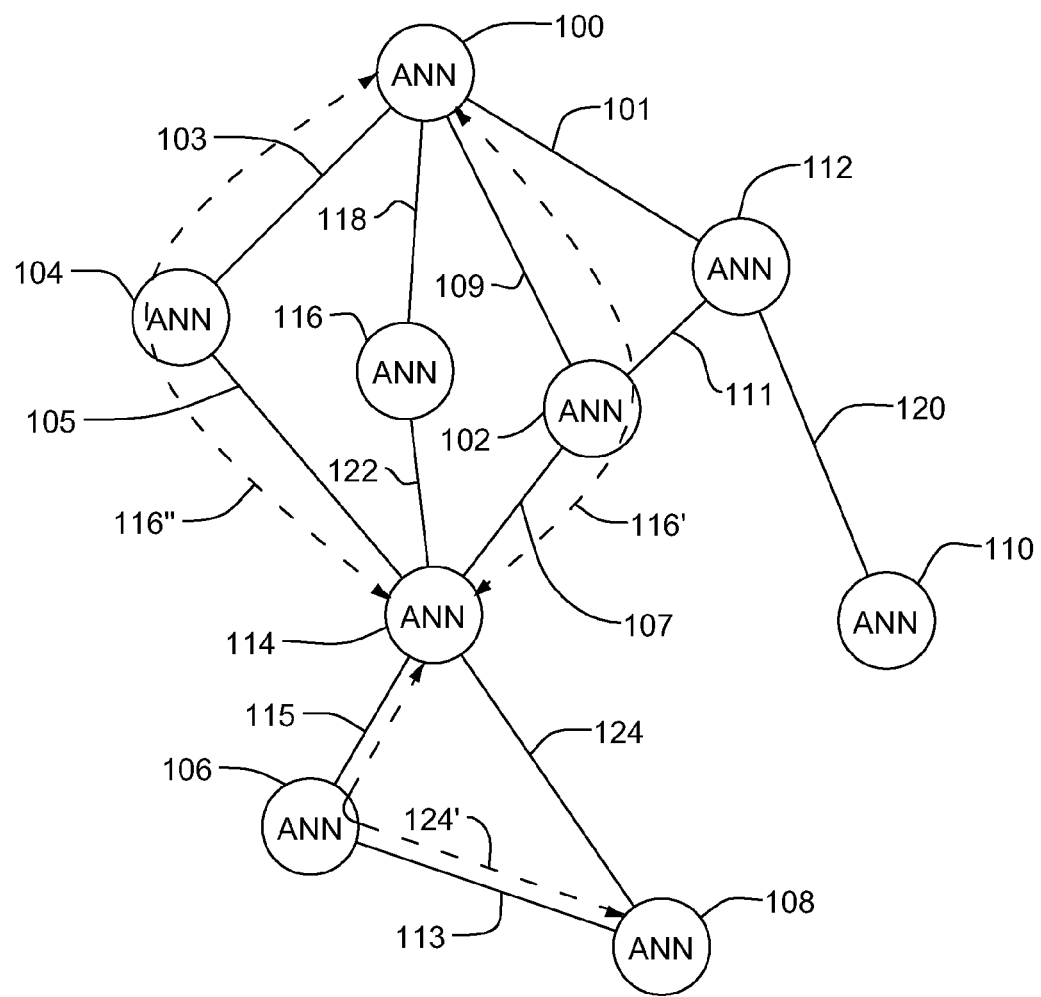
Figure 1C:
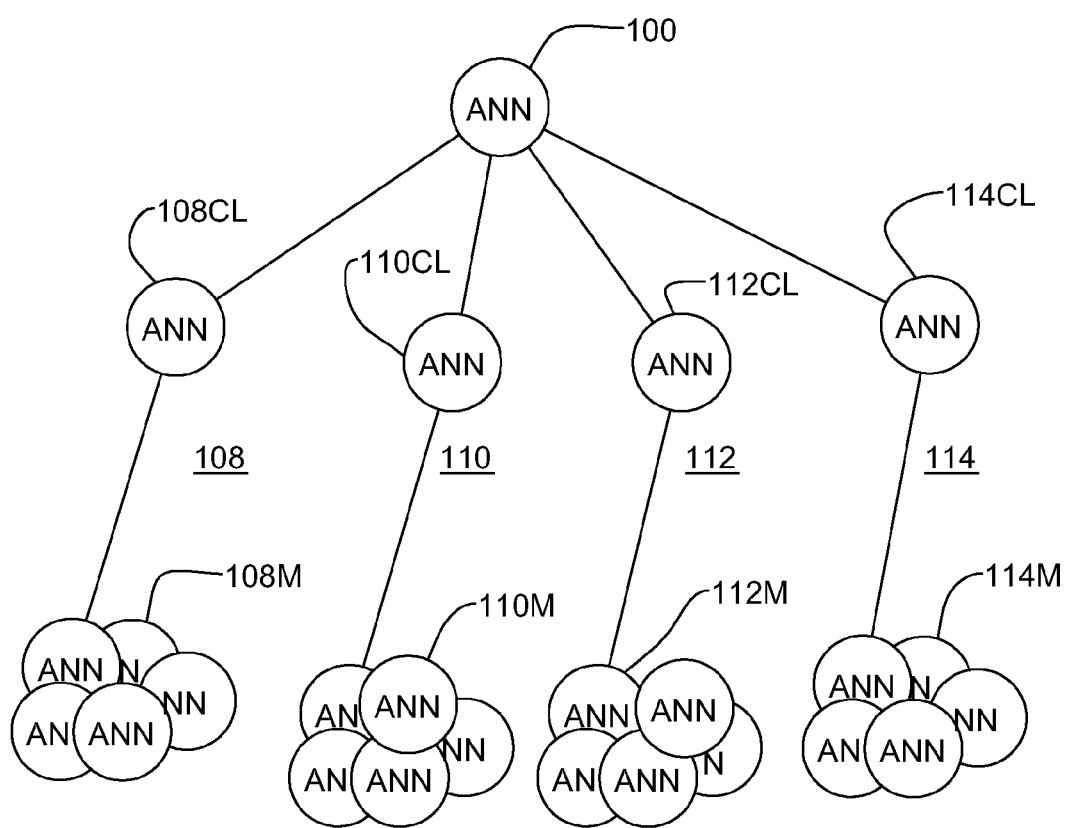

Turning now to the drawings and more particularly, FIGS. 1A-C show a battlefield example of a self monitoring ad hoc mobile communications network and graphical representation of the battlefield example according to an advantageous embodiment of the present invention. The preferred self monitoring ad hoc mobile radio network is an Artificial Neural Network (ANN) based communications network. More particularly, a preferred ad hoc mobile radio network is an Adaptive Self Organizing Neural Network (ASONN) of self monitoring artificial neurons or, an ANN element based communications devices, stations or nodes and is referred to herein as a Mobile Communications Neural Network (MCNN). Each node monitors other directly connected nodes to identify and predict disconnections and, expected re-connections. As shown in this example, a MCNN may include both airborne and ground based communications units or stations as nodes and, preferably is hierarchically organized. Although described herein with reference to a battlefield application, this is for example only and not intended as a limitation. The present invention has application to quickly providing self-sustaining and self-organized communications where no fixed land mobile network may be available or has been destroyed, e.g., in an emergency situation or during a severe natural disaster.

The MCNN airborne nodes may include both unmanned air vehicles (UAVs) 100 and manned air vehicles, e.g., attack helicopters (not shown). Ground nodes may include unmanned ground vehicles (UGVs) 102, 104, 106, and ground forces including, for example, infantry units 108 and manned ground vehicles, e.g., tank units 110, 112, 114 and individual tanks 116. Some of these nodes are healing neurons, e.g., UVGs 102, 104, 106, with dynamic time dependent positions. Typically, the healing neurons may be used or recalled for healing the network when/if it is partitioned. Others of the remaining nodes may be used for training or for providing input to the neural network to adapt or readjust the healing nodes (neurons) positions to keep entire network connected. Also, each mobile node may employ an ANN element that functions as an approximator for approximating the link life to all neighboring nodes. The ANN elements may be trained either off-line or on-line. Examples of suitable ANN elements is discussed by S. Haykin in "Neural Networks: A Comprehensive Foundation," Macmillan Publishing, New York (1994). The ANN elements can be organized, for example, as Multilayer Perceptrons (MLP), or a Radial basis function neural network. Multilayer Perceptrons are widely used for pattern classification in a feed-forward network, are trained with a standard back-propagation algorithm and, are supervised in training for a desired response.

Further, a preferred MCNN is scalable. So, preferably, to facilitate managing large networks, the MCNN is organized in sub-networks of nodes or groups of nodes. A node is also known as a vertex. A plurality of nodes may be called vertices. Groups of nodes, also called clusters, may be treated as a single node when the cluster has full connectivity or a cluster leader or in the alternative as a cluster. The size, S(C), of a cluster C is the cardinal number C. Each cluster performs substantially as a MCNN within the bounds of the cluster. So, for example, if the infantry unit 108 includes a single MCNN device, the infantry unit 108 is a node. Alternately, each individual soldier in each infantry unit 108 may carry a personal MCNN unit (not shown) for individual communications and, therefore, is a node. Typically, each tank in each tank unit 110, 112, 114, includes a MCNN unit and, therefore, is a node and each tank unit 110, 112, 114 is a cluster. For convenience of discussion, in the graphical representation of FIG. 1B, the infantry unit 108 and tank unit 110, 112, 114 are taken as clusters and represented as a single node in the graph.

Each cluster and each node within a cluster has a known position and velocity and is capable of communicating directly with any other node within the cluster that is within range and not otherwise blocked. In the network graph of FIG. 1B, links between directly connected nodes/clusters 102, 104, 106, 108, 110, 112, 114 and 116 are represented by edges 101, 103, 105, 107, 109, 111, 113, 115, 118, 120, 122 and 124. Edges may also be called links. Two nodes that can communicate directly with each other are directly linked and can exchange information directly with one another. So, for example, the UAV 100 is directly connected, initially, to UVGs 102, 104, tank unit 112, and through link 118 to tank 116. Direct Communication may be blocked between two nodes, for example, by terrain, structures, atmospheric conditions, battlefield conditions (e.g., countermeasures) or otherwise. So, two nodes that cannot directly communicate (i.e., are not linked) can connect over a path through other directly linked nodes and so, are indirectly linked through one or more intervening nodes. For example, tank unit 110 is networked through link 120 to tank unit 112 and so, indirectly connected or linked to other nodes. Tank unit 114 is indirectly connected to the UAV 100, for example, through link 122 to tank 116 and through link 118 from tank 116. Infantry unit 108 connects to the network indirectly through link 124 to tank unit 114. An indirect path between tank unit 114 and UAV 100 may be via 116' or 116" through UVG 102 or UVG 104, respectively. The MCNN diameter is the graph diameter determined by the "longest shortest path" between any two nodes. So, in the present example, the MCNN diameter is the path between the infantry unit 108 and tank unit 110.

Each cluster is organized around what may be called a Cluster leader (CL) or a clusterhead. Typically, an operator selects initial cluster leaders as described hereinbelow and, thereafter, the cluster leaders may each hand off to other cluster nodes whenever the cluster leader determines that such a hand off may be necessary or desired. The size of each cluster is the number of nodes in the cluster. The degree of any node is the number of edges connected to the node, i.e., the number of directly linked nodes. A subset of nodes that are mutually reachable by a path of a given maximum length, k, is referred to as a k-cluster. A clique is a k-cluster with k=1. The infantry unit 108 and the tank units 110, 112 may each include several nodes and so, although represented graphically in FIGS. 1A and 1B as nodes, may each represent a clique or a k-cluster as shown in FIG. 1C.

FIG. 1C shows an example of hierarchical organization of a preferred MCNN with cluster leaders hierarchically organized with several sublevels within the MCNN and within each cluster. The nodes of FIG. 1A including the UAV 100, UGVs 102, 104, 106, the infantry unit 108 and the tank units 110, 112, 114 and tank 116 may each be designated/treated as a cluster. One node is identified as the manager over the entire MCNN and is designated as the Network Management System (NMS), the UAV 100 in this example. A single node is selected as cluster leader 108CL, 110CL, 112CL and 114CL from respective cluster members 108M, 110M, 112M and 114M in each of the infantry unit 108 and the tank units 110, 112, and 114. Each cluster leader 108CL, 110CL, 112CL and 114CL acts as a sub-network (cluster) manager. Optionally, secondary and tertiary or lower order cluster leaders (not shown) may be selected from members 108M, 110M, 112M and 114M in each respective cluster. Each cluster leader 108CL, 110CL, 112CL and 114CL is responsible for inter-cluster communication and cluster leaders 108CL, 110CL, 112CL and 114CL exchange information (e.g., node connectivity and strength, network status, and cluster leader assignment/reassignment information) with each other and with the NMS the UAV 100, e.g., MCNN status. Since each node may include an ANN element, each ANN node may be assigned/assume responsibility as a cluster leader, dynamically, as the cluster changes. Also, typically, each cluster leader may be assigned/assume responsibility as the NMS for the entire MCNN, dynamically, as the network configuration changes. The NMS may act as a local cluster leader or, as an independent node, unassigned to a cluster or assigned to a cluster of one.

Figure 2:
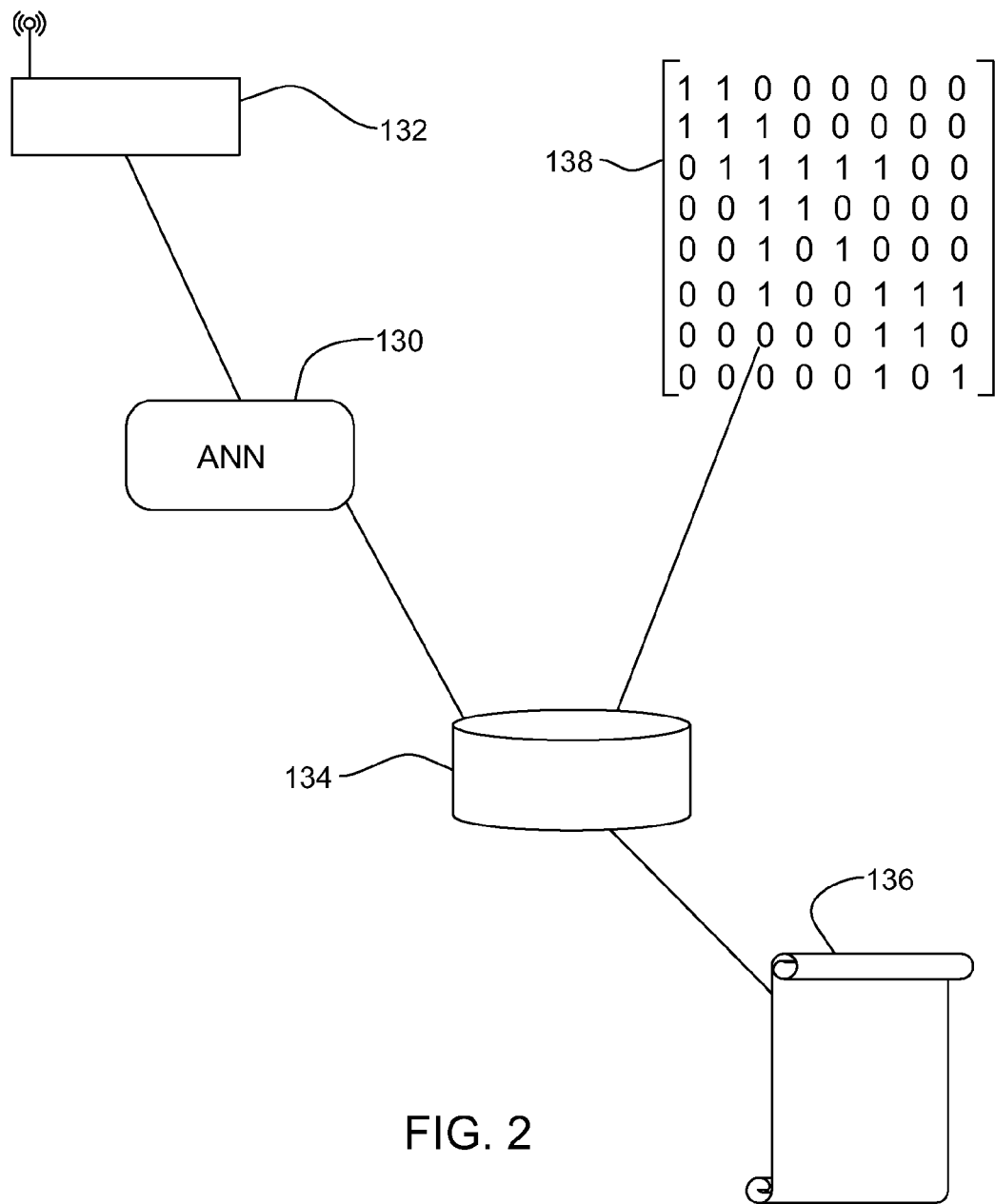
FIG. 2 shows an ANN element in a block diagram of an example of preferred node.

FIG. 2 shows an ANN element 130 in a block diagram of an example of preferred node, e.g., 100-116 in FIG. 1. Typically, a preferred node includes a wireless communications capability or unit 132 for communicating with other nodes. Although for military applications, each preferred node 100-116 may be specially designed according to military specifications, for other applications, the nodes 100-116 may be suitably adapted state of the art wireless communications devices equipped with an ANN element 130. So, preferably, the wireless communications unit 132 also includes a local input/output (I/O) capability, e.g., for voice, image or text. Optionally, the I/O capability may be provided by a suitable I/O port, e.g., connected to the ANN element 130 and the wireless communications unit 132. Also, this wireless communications unit 132 may include some locational capability (e.g., GPS) and a typical wireless Local Area Network (w-LAN), e.g., wi-fi, capability for receiving information generated off-line, e.g., on a main-frame computer prior to deployment. Also, a preferred node includes local storage 134 that may be non-volatile storage, volatile storage or both. Suitable non-volatile storage may include, for example, hard disk storage, Read Only Memory (ROM) and Electrically alterable ROM such as Flash EEPROM. Normally, the local storage 134 contains terrain information, previously supplied learning parameters and local copies of network information including tables 136 and matrices 138, e.g., a network connectivity table and connectivity matrix.

Prior to deployment, simulation results are collected for training the nodes, preferably, from theater simulation as described in U.S. Pat. No. 7,542,436, "TACTICAL COGNITIVE-BASED SIMULATION METHODS AND SYSTEMS FOR COMMUNICATION FAILURE MANAGEMENT IN AD-HOC WIRELESS NETWORKS," to Hesham El-Damhougy, filed Jul. 22, 2005, assigned to the assignee of the present invention and incorporated herein by reference. Preferably, training is also done using artificial neurons, which may or may not be identical to the neurons 130 in the network or neurons located in healing nodes. After training, an operator, for example, identifies cluster leaders and one node as the NMS. The nodes receive theater information and training results from the simulation that may include, for example, a coarse terrain map, a mission mobility profile, and coarse propagation models. The coarse propagation models may include suitable well-known telecommunications models, such as for example, an Epstein-Peterson model for physical analysis and mixed mode models, such as ITU Radiocommunication Sector (ITU-R) and Longley-Rice/Longley-Rice Adaptive models. Thereafter, the NMS and cluster leaders continually monitor MCNN status and predict network changes based on node mobility for real time network planning and healing.

Typically, because of node mobility, at any given time some clusters may not be able to communicate directly and/or indirectly with others. So, to track individual connections to each other, the nodes form and maintain a connectivity matrix, e.g., 138. The connectivity matrix 138 is a table that indicates the position of every node in the cluster and represents all node connections for each node. The NMS maintains a connectivity matrix 138 for the entire MCNN. Preferably, each cluster leader maintains a local copy of the connectivity matrix 138 with rows and columns corresponding to specific nodes and ones and zeros indicating connectivity (1) or non-connectivity (0) directly between any two nodes in a network.

During normal operation where nodes may be constantly in motion, periodically, each node sends connectivity table updates to the cluster leader. Preferably, for computational efficiency, a node initiates an update to the cluster leader only when table entries change in the node and each node sends only the changed entries. Each cluster leader monitors link quality in the cluster and maintains tables and matrices, such as the connectivity matrix 138 (for k nodes in the cluster, the cluster leader maintains connectivity matrices $C_1, C_2, \ldots, C_k$) and a link life matrix, for local nodes within the cluster. The link life is the length of time a particular pair of connected nodes are expected to stay connected. In each cluster the cluster leader or, another designated node within that cluster, determines link life for each pair of nodes within the cluster. So, typically, the cluster leaders maintain a link life estimation matrix that quantitatively indicates a value for link life between any two nodes in the cluster. Nodes at rest (not moving) may be represented as having an arbitrarily high link life value, e.g., a defined maximum. Periodically, the cluster leader distributes updates, both to local nodes and to the NMS, and exchanges link life information with the NMS. Preferably, for computational efficiency the cluster leaders initiate updates only when matrix/table entries change for the respective cluster and each cluster leader sends only changed entries. The NMS can use the updates to arrive at an overall network or global connectivity matrix. Alternately, the global connectivity matrix can be maintained at one or more of the cluster leaders instead or in addition to the NMS.

Cluster leaders can also take some local actions with respect to the cluster, such as partitioning the cluster, if necessary, and healing the cluster partitions after partition changing events, e.g., loss of a node or loss of communications with a node linking partitions. Typically, the MCNN is partitioned to maintain communication across partition boundaries. If necessary, e.g., the infantry unit 108 of FIG. 1 splits into smaller groups, individual clusters may be partitioned into smaller clusters. Network/cluster partitioning is described, for example, in U.S. patent application Ser. No. 11,426,425, "NEURAL NETWORK-BASED MOBILITY MANAGEMENT FOR SELF-PARTITION DETECTION AND IDENTIFICATION OF MOBILE AD HOC RADIO NETWORKS" to Hesham El-Damhougy, filed coincident herewith, assigned to the assignee of the present invention and incorporated herein by reference.

Since, under typical operating conditions, e.g., in the battlefield, all nodes are continually in motion, signals between nodes may be changing continually; individual links may be lost at any time. Thus, at any point in time, each node may lose contact with linked nodes and/or make direct contact or re-establish direct contact with previously disconnected nodes. In some instances these changes may occur randomly, e.g., from node additions and deletions and from terrain or weather changes. For example, some nodes may move out of range of others, local interference such as terrain or countermeasures may block communications between nodes, and some nodes may even be destroyed. Also, intermediate paths may change as new nodes add themselves to the MCNN or as previously connected nodes reconnect. Whenever a link is lost, any disconnected nodes must find alternate connection paths that may force MCNN partition changes. In the example of FIG. 1A, tank 116 is destroyed, which breaks the links 118, 122 in the indirect connection between tank unit 114 and UAV 100. Consequently, tank unit 114 must reconnect indirectly to UAV 100 through UGV 102 or 104 over path 116' or 116". Also, tank unit 114 movement, e.g., into the hills, may break the link 124, forcing the infantry unit to reconnect through UGV 104 over path 124'.

The NMS manages and coordinates these network changes (link losses, node additions and deletions) with the cluster leaders and each cluster leader manages and coordinates changes within its respective cluster. As noted hereinabove, each node continually gathers connectivity data with connected nodes, e.g., signal strength, relative direction of travel and relative speed. The collected data is distributed throughout the MCNN for maintaining connectivity. The NMS and cluster leaders use the collected data in node mobility prediction to track and predict node movement for maintaining connectivity through partition changes that may be caused by predictable/forecastable events. Node mobility prediction is described, for example, in U.S. Pat. No. 7,555,468, "NEURAL NETWORK-BASED NODE MOBILITY AND NETWORK CONNECTIVTY PREDICTIONS FOR MOBILE AD HOC RADIO NETWORK," to Hesham El-Damhougy, filed coincident herewith, assigned to the assignee of the present invention and incorporated herein by reference.

When two nodes lose communication with each other and a direct link between the two is broken, the NMS and/or the responsible cluster leader take(s) remedial action. Typically, the NMS and/or the responsible cluster leader determine(s) an expected time-to-reconnect, find alternate connection paths, nodes to be repositioned, or whether to reconfigure the partitions to heal the MCNN. Network planning and healing is described for example in U.S. patent application Ser. No. 11/426,428, "NEURAL NETWORK-BASED MOBILITY MANAGEMENT FOR HEALING MOBILE AD HOC RADIO NETWORKS," to Hesham El-Damhougy, filed coincident herewith, assigned to the assignee of the present invention and incorporated herein by reference. The cluster leader may determine a time-to-reconnect, for example, as the length of time elapsed before a particular pair of disconnected nodes will. So after losing the link to tank unit 114, for example, the infantry unit 108 may be repositioning to a location with a clear path to the tank unit 114. The cluster leader for infantry unit 108 calculates a time to reconnect based on the relative speed of the tank unit 114, the course and speed of the infantry unit 108 and any previously provided terrain information. Likewise, the cluster leader for tank unit 114 calculates a time to reconnect based on the relative speed of the infantry unit 108, the course and speed of the tank unit 114 and the same previously provided terrain information.

Figure 3:
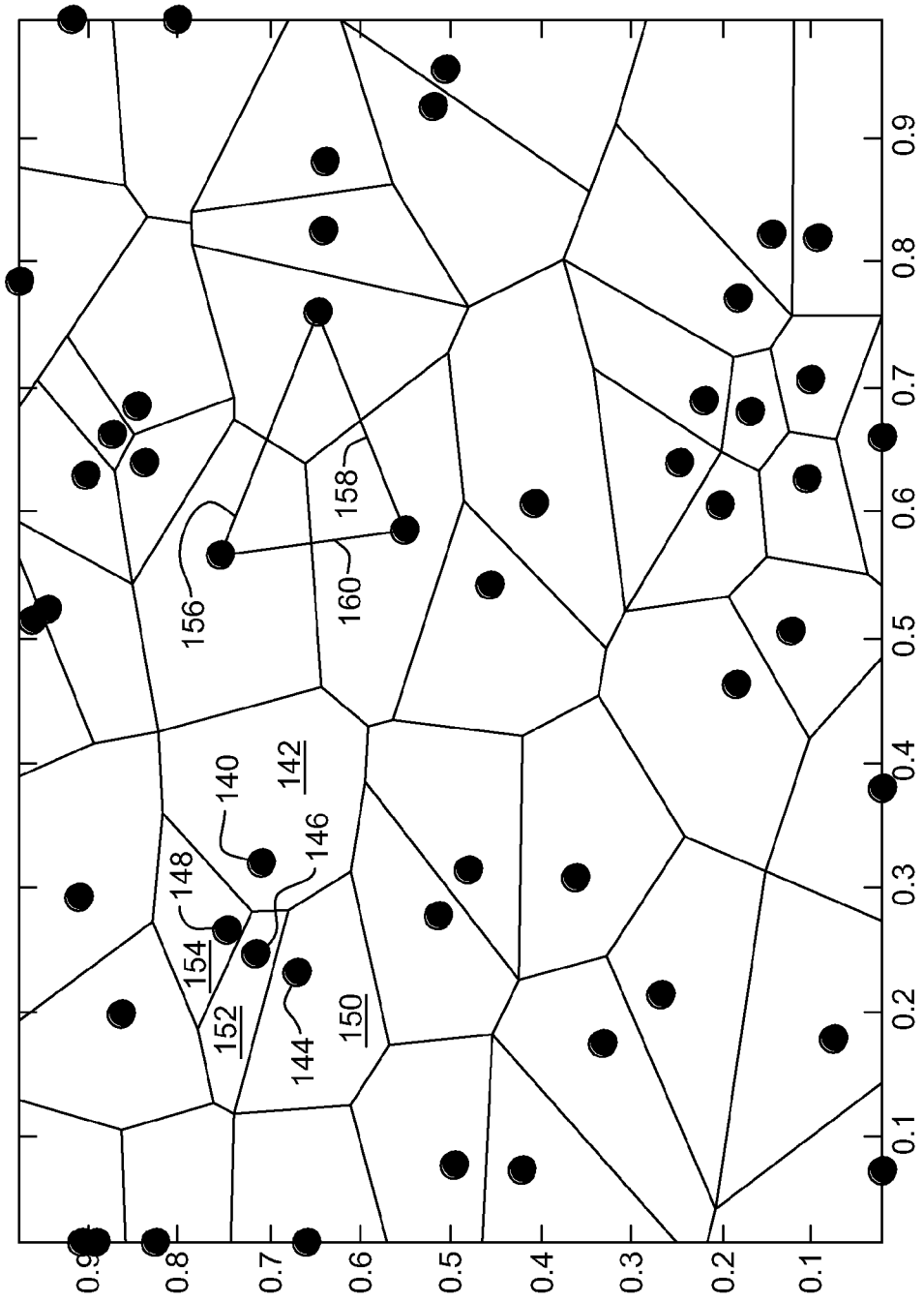
FIG. 3 shows an example of a tessellated MCNN coverage area.

Cluster leader and NMS selection begins by tessellating the MCNN coverage area, e.g., the battle theater of FIG. 1. FIG. 3 shows an example of a tessellated MCNN coverage area, that may be the entire theater, or depending on the tactical mission at hand, just a local area within the theater. Preferably, the tessellation is done off-line, e.g., during training simulation, using artificial neurons, which may or may not be identical to the neurons in the network, the training neurons or neurons located in healing nodes. Tessellation is conducted substantially similar to network planning and healing and, normally, occurs after partitioning the entire coverage area (e.g., the battle theater), also by an operator or planner. An interactive example of tessellating an area into regions that, for a preferred MCNN, have optimum coverage is available at www.diku.dk/hjemmesider/studerende/duff/Fortune.

The tessellation divides the coverage area into disjointed regions with each node in one region and each region assigned a cluster leader, where each region is represented by a node, known in the art as a Voronoi node (e.g., 140) or Voronoi prototype. For each region (e.g., 142) in the tessellated coverage area, points in that region are closer to the respective Voronoi node 140 than to the Voronoi nodes 144, 146, 148, in any other region. So, the MCNN nodes in each region 142, 150, 152, 154 have the strongest radio frequency (RF) connectivity to the respective Voronoi node 140, 144, 146, 148. What is known in the art as a Delaunay graph may be generated from the Voronoi graph by connecting Voronoi nodes that share the same boundary edge and so, have an RF connection by the edge, e.g., 156, 158, 160.

So, with MCNN nodes located at the Voronoi nodes separated by a distance that is shorter than a maximum allowable separation to maintain direct communication, for example, the Delaunay edges identify linked nodes. Once the coverage area is tessellated and Delaunay edges are generated, the network may be partitioned as noted above and cluster regions are selected, e.g., based on a selected maximum allowable cluster length. Cluster leaders are selected with a primary and secondary cluster leader being selected for each cluster. Also, optionally, lower order (tertiary, ..., $n^{th}$ order) cluster leaders may be selected within the clusters.

Higher order Voronoi tessellation can also be obtained by relaxing the acceptable RF connectivity loss threshold $\rho$ to $k\rho$, for example, where k is an integer$\geq 1$. So, in this example, cluster leaders are separated by a $k^{th}$ hop or more from each other.

Ideally, the initially selected cluster leaders remain cluster leaders during the deployment. So, preferably, the cluster leaders are selected to minimize the occasion of handovers to lower order cluster leaders. So, most preferably, the cluster leaders are selected to minimize the frequency of attempts by nodes either to become a cluster leader or once cluster leader, to surrender its role as a cluster leader. One approach to optimally selecting cluster leaders is to define a time based system function (F(t)), referred to as the cluster leader objective function, to sift cluster nodes for stability. Stability sifting criteria can include an expected average number of times for a particular node that the cluster leader is expected to change, i.e., is handed over from one node to another node. In this example, the cluster leader objective function is based on link lifetimes to determine route lifetime. The cluster leaders are selected based on the most stable route. So, for example, for a number of nodes ($N_k(t)$) within Voronoi region k at time t, the cluster leader objective function may be chosen to have the form:

$$F(D_{ik}(t), T_{ik}(t), N_k(t)) = \frac{C_0}{N_k(t)+1} + C_1 D_{ik}^2 + \frac{C_2}{T_{ik}^2}$$

or, $$F(D_{ik}(t), T_{ik}(t), N_k(t)) = \frac{C_0}{N_k(t)+1} \frac{C_1 D_{ik}}{T_{ik}};$$

where the coefficients, $C_0$, $C_1$ and $C_2$, are heuristically determined system parameters, $T_{ik}(t)$ is the link life between node i and an imaginary node located at Voronoi prototype of region k, and $D_{ik}(t)$ is the Euclidean distance between position node i and Voronoi prototype k at time t. The coefficients can be metrics or weights, for example, that reflect the relative importance between the Euclidian distance, link life and the number of nodes within a Voronoi region. Preferably, the lowest order coefficient, $C_0$, is chosen sufficiently smaller than the two higher order coefficients, $C_1$ and $C_2$, this favors selecting the highest degree node, i.e., the node that has more links and so, more nodes attached to it. By selecting the highest degree node in the cluster as a cluster leader, the most connected node, the most connected node is selected as a cluster leader over lower degree nodes. Furthermore, by varying these coefficient parameters $C_0$, $C_1$ and $C_2$ and simulating the over all system off-line, an expected number of handovers can be estimated, to easily estimate/determine optimum values for these parameters. Other criteria considered in selecting the coefficients include minimizing power consumption and communication bandwidth overhead. Power consumption can be minimized by assigning a relatively large value to $C_1$, because transmit power is proportional to the Euclidean distance. The cluster leader objective function is applied to every node within each region; and, the node with the minimum result for each region is selected as cluster leader. So, for each region k, the node J is selected according to $$F(D_{Jk}(t), T_{Jk}(t), N_k(t)) = \operatorname*{Min}_i F(D_{ik}(t), T_{ik}(t), N_k(t)).$$

Moreover, this cluster leader objective function may be used in network planning and healing to optimize cluster handovers between primary and secondary cluster leaders. For cluster handovers, a system parameter (T*) is tuned, e.g., during system simulation, for the best overall performance. Then, a handover time parameter $T_h$ may be determined for each cluster leader, where handover will occur at time $T_h = T_{Jk} - T^*$ for the node with the minimum cluster leader objective function result.

Figure 4:
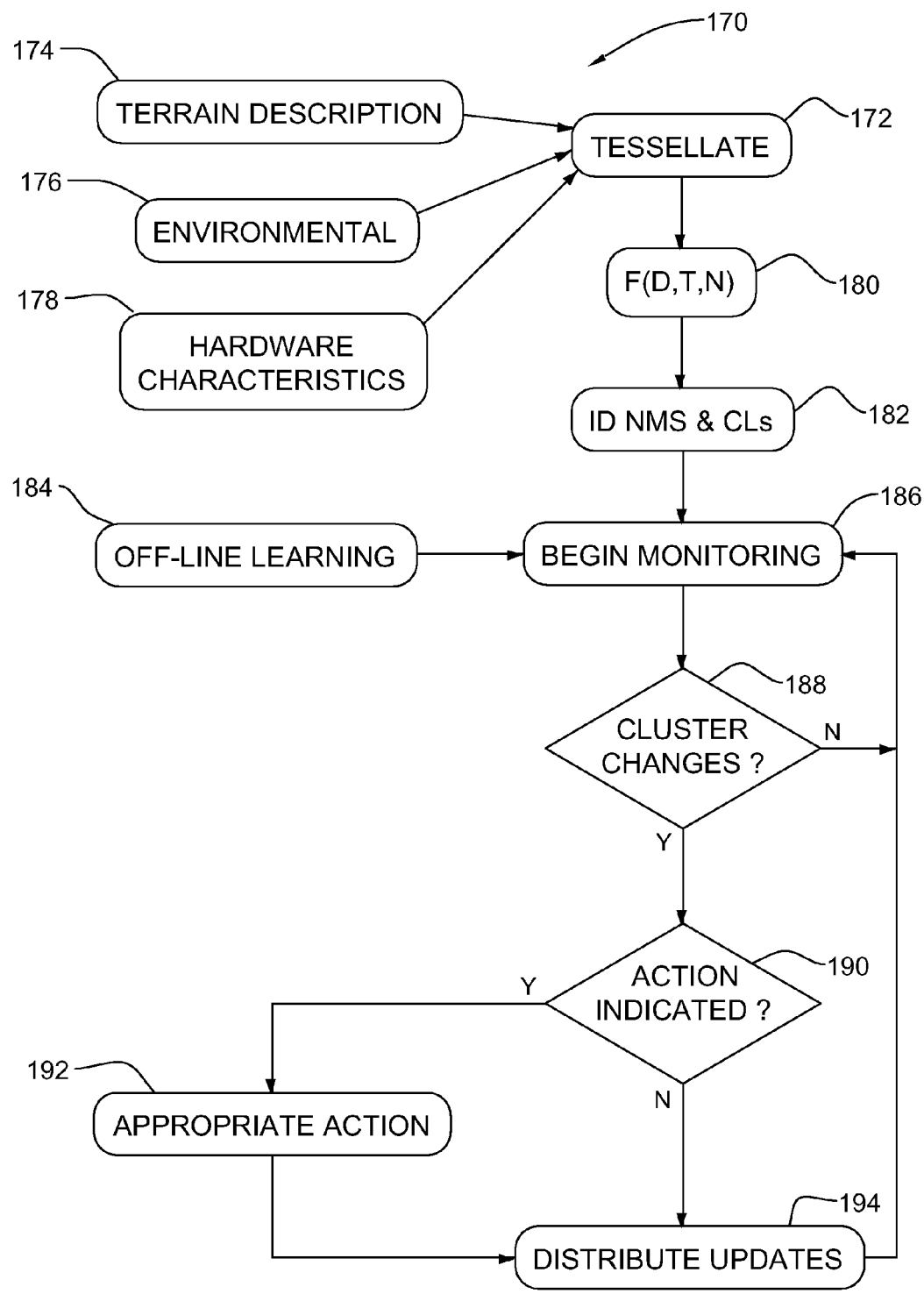
FIG. 4 shows a flow diagram example of MCNN operation.

FIG. 4 shows an example of MCNN operation 170 according to an advantageous embodiment of the present invention. A description of the expected theater of operation is provided for tessellation in step 172 that may include, for example, a description of the theater terrain 174, expect environmental operating conditions 176 and any hardware specific parameters 178. After tessellating the theater, in step 180 a cluster leader objective function is selected and applied to each node. In step 182, the NMS and cluster leaders are identified, including lower order cluster leaders. Off line learning results are provided in step 184 and, in step 186, the NMS and cluster leaders begin monitoring the network. Monitoring continues until in step 188, a cluster leader identifies any cluster changes. Then, in step 190, the cluster leader/NMS determines whether it is necessary to partition, heal the network or if such action is likely to be necessary in the near future and, if so, in step 192 takes the appropriate action, e.g., for selection and handover. After taking the appropriate action or, if none is needed, in step 194 network changes and updates are distributed through out the network and monitoring continues in step 186.

Figure 5:
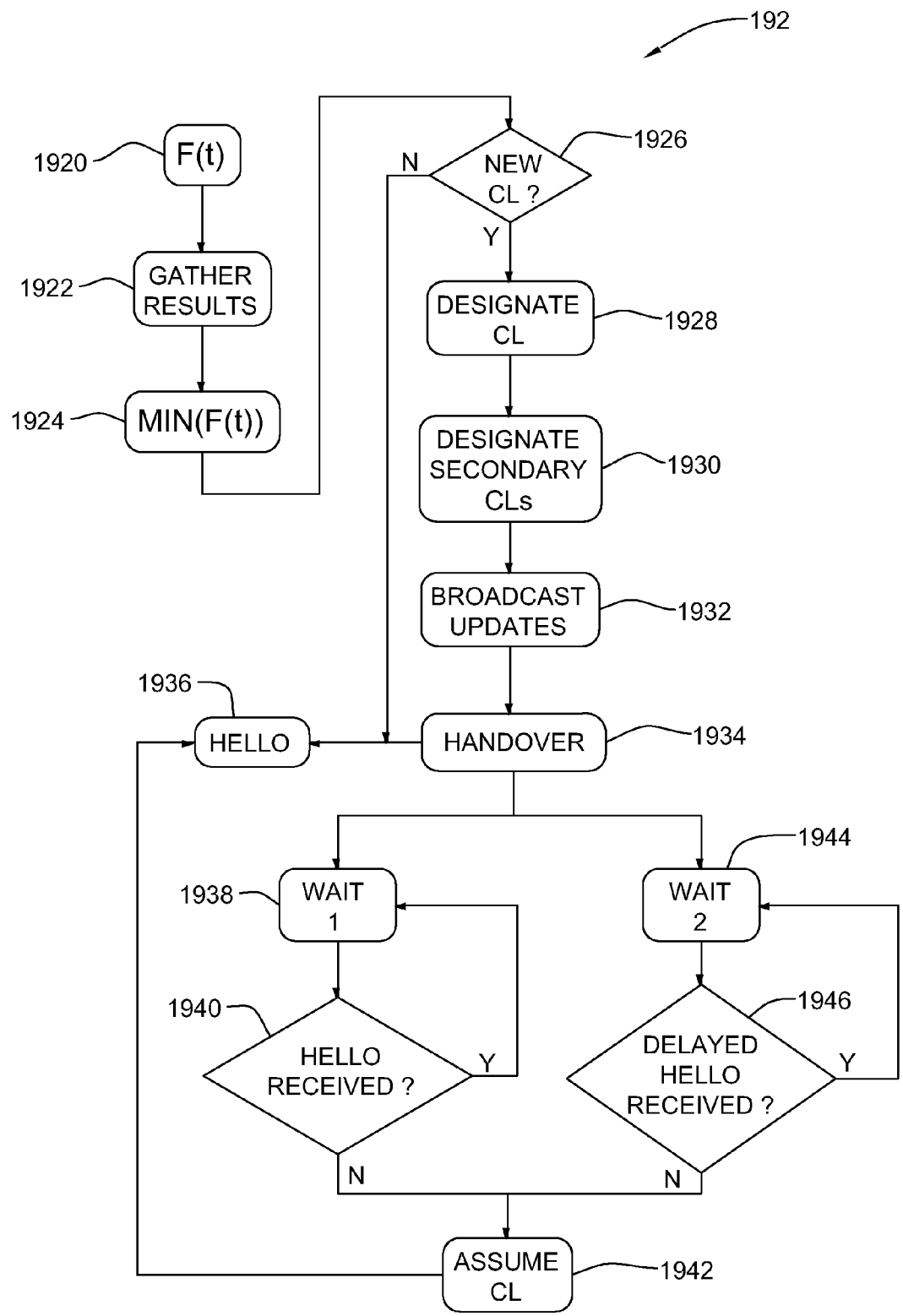
FIG. 5 shows an example of cluster leader selection and handover.

FIG. 5 shows an example of taking appropriate action for selection and handover in step 192. Based on the previously defined selection criteria, in step 1920 each node in a Voronoi region calculates its cluster leader objective function F(t). Then, in step 1922 each node forwards the calculated clustering leader objective function value to the current cluster leader. In step 1924 the cluster leader selects the node that has the lowest F(t) value from its member values. In step 1926 if the number for the current cluster leader is not the lowest; then, in step 1928 the cluster leader designates the node with the lowest value as the new primary cluster leader. If two or more nodes have the same value for F(t), either one may be randomly selected or, the one with the lowest identification value may be selected as the new cluster leader.

Continuing in step 1930, optionally, the cluster leader can also select two secondary (deputy or lower order) cluster leaders, again based on F(t) values. The secondary cluster leaders improve reliability. Next in step 1932, the current cluster leader broadcasts the update information. For example, the current cluster leader broadcast a special message, e.g., "CL-Successor" message. In step 1934, when the new cluster leader and two deputies receive notification, they assume status as the new primary and secondary cluster leaders. Thereafter, in step 1936, the cluster leader periodically sends a "Hello" message. Also, if the current cluster leader has not changed in step 1926, then, the cluster leader continues sending "Hello" messages in step 1936. With each "Hello" message and after a predefined time interval in step 1938, if the first deputy cluster leader does not receive a "Hello" message in step 1940; then in step 1940 the first deputy automatically assumes status as the primary cluster leader and begins periodically sending "Hello" messages in step 1936. Similarly, in step 1942 waits another predefined time interval for a "Hello" message from either the primary or the first deputy cluster leader; and in step 1944 if the second deputy cluster leader does not receive the "Hello" message; then in step 1940, the second deputy cluster leader assumes status as the primary cluster leader and so, begins periodically sending "Hello" messages in step 1936. Preferably, these two predefined time intervals are determined and fixed during the simulation and planning phase. The periodicity of these "Hello" messages are selected, for example, in conjunction with the parameters C0, C1, C2 to minimize transmit power or bandwidth consumption. Once either of the deputies assumes status as the primary cluster leader, in step 1946 the new cluster leader broadcasts "Handover" message to all nodes within its Voronoi region to inform other cluster members of the new cluster leader. As each node become aware of other node F(t) values, the selection process can start allover again.

This approach can be used effectively for rout selection in routing protocols, especially for selecting the shortest path between cluster leaders specially those employing clustering-based routing protocols. A more complex cluster leader objective function may be used as a link cost metric to minimize any route length increase resulting from a handover. Instead of using a cluster leader objective function based only on link lifetimes (e.g., $T_{11,12}$, between cluster leaders 11 and 12) to determine route lifetime and then choosing the most stable route, link stability may be considered and more stable links selected. In this alternate approach, a link cost function may be used that is inversely proportional to link lifetime and is proportional to the Euclidian distance of the egress (going or coming out) endpoint of the link from the destination node. This function and relevant proportionality constants are tuned for best overall performance. This approach favors more stable links, but does not consider those links from a particular node that do not go towards a destination node. Several well known methods are available, e.g., widely used Djikstra's algorithm or Bellman-Ford algorithm, to choose the next hop on the least cost (shortest) path that may be readily adapted for this link cost approach.

Advantageously, a preferred ad hoc communications network is self-managing and adapts well to operating changes, and in particular to interconnectivity changes between preferred nodes. After initially identifying hierarchically organized network leaders, cluster nodes reorganize themselves and change cluster leaders as the situation requires. Further, a preferred ad hoc communications network optimizes node connectivity to maintain network-wide connectivity in spite of node and connection changes. New nodes can be easily inserted and the loss of a node does not always require reconfiguring the network to maintain communication.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

I claim:

1. An ad hoc communications network comprising:
   a plurality of wireless devices connectively coupled, each of said wireless devices including a neural network element;
   a Network Management System (NMS) providing overall network management, said NMS being one of said plurality of wireless devices; and
   at least one cluster leader, each cluster leader managing a group of said wireless devices, each said group including at least one of said wireless devices, wherein said NMS monitors connectivity of said plurality of wireless devices and passes identified changes to each said cluster leader.

2. The ad hoc communications network as in claim 1, wherein at least one said group includes a plurality of leaders, one of said plurality of leaders being identified as the cluster leader and the remaining ones of said plurality of leaders being lower order cluster leaders.

3. The ad hoc communications network as in claim 1, wherein each of said cluster leaders monitors connectivity of wireless devices in a respective said group and passes identified changes to said NMS.

4. The ad hoc communications network as in claim 1, wherein each of said wireless devices is a node in a cluster of said plurality of wireless devices.

5. The ad hoc communications network as in claim 4, wherein each said node in each said cluster contains a copy of a connectivity matrix indicating connectivity within a respective said cluster.

6. The ad hoc communications network as in claim 5, wherein each said connectivity matrix indicates connectivity of all nodes within said network.

7. The ad hoc communications network as in claim 4, wherein each of said plurality of cluster leaders has a minimum cluster leader objective function value for its respective cluster.

8. A method of managing an ad hoc communications network comprising the steps of:
   a) determining a cluster leader objective function value for each network node in a cluster, said cluster having a plurality of network nodes, wherein for each network node ($N_k(t)$) within Voronoi region k at time t, said cluster leader objective function value has the form $$F(D_{ik}(t), T_{ik}(t), N_k(t)) = \frac{C_0}{N_k(t)+1} + C_1 D_{ik}^2 + \frac{C_2}{T_{ik}^2},$$

where the coefficients, $C_0$, $C_1$ and $C_2$, are heuristically determined system parameters, $T_{ik}(t)$ is the link life between network node i and an imaginary node located at Voronoi prototype of region k, and $D_{ik}(t)$ is the Euclidean distance between position network node i and Voronoi prototype k at time t;
   b) providing each cluster leader objective function value to a current cluster leader identified for said cluster;
   c) selecting a minimum value from provided cluster leader objective function values, the selected said value identifying a cluster leader for said cluster; and when a new cluster leader is identified d) broadcasting the identity of the identified said cluster leader to said plurality of network nodes.

9. The method as in claim 8, wherein whenever, the identified cluster leader is a different network node than a current said cluster leader, said method further comprises the steps of:
   e) initiating a handover from said current cluster leader to said identified cluster leader, said identified cluster leader node becoming said current cluster leader; and
   f) sending a hello message from said current cluster leader.

10. The method as in claim 9, wherein the step (c) of selecting further comprises selecting lower order cluster leaders from said plurality of network nodes.

11. The method as in claim 10, wherein said lower order cluster leaders include a secondary cluster leader and a tertiary cluster leader.

12. The method as in claim 8, wherein said cluster is one of a plurality of clusters and the step (d) of broadcasting further broadcasts the identity of said cluster leader to other ones of said plurality of clusters.

13. The method as in claim 8, wherein each time entries in a connectivity matrix for said plurality of network nodes in said cluster change, each node returns to step (a) of determining and determines said cluster leader objective function value.

14. A method of organizing and managing an ad hoc communications network comprising the steps of:
   a) selecting a Network Management System (NMS) from a plurality of nodes forming an ad hoc communications network, the node selected as said NMS including a neural network element and providing overall ad hoc communications network management;
   b) identifying nodes including a neural network element with a minimum cluster leader objective function value in each cluster of nodes in an operating coverage area, identified said nodes being selected as cluster leaders, wherein for each ($N_k(t)$) within Voronoi region k at time t, said cluster leader objective function value has the form $$F(D_{ik}(t), T_{ik}(t), N_k(t)) = \frac{C_0}{N_k(t)+1} \frac{C_1 D_{ik}}{T_{ik}},$$

where the coefficients, $C_0$ and $C_1$, are heuristically determined system parameters, $T_{ik}(t)$ is the link life between node i and an imaginary node located at Voronoi prototype of region k, and $D_{ik}(t)$ is the Euclidean distance between position node i and Voronoi prototype k at time t;
   c) providing training results to said each cluster of nodes; and
   d) monitoring connectivity within said each cluster of nodes.

15. The method as in claim 14, wherein whenever the monitoring step (d) identifies network changes in a cluster, said method further comprises the steps of:
   e) determining said cluster leader objective function value for each node in said cluster;
   f) providing each cluster leader objective function value to a current cluster leader identified for said cluster;
   g) selecting a minimum value from provided cluster leader objective function values, the selected said value identifying a cluster leader for said cluster;
   h) selecting lower order cluster leaders from remaining nodes in said cluster; and
   i) broadcasting the identity of said cluster leader to said nodes in said cluster and to other said clusters.

16. The method as in claim 15, wherein whenever the identified cluster leader is a different node than said current cluster leader, said method further comprises the steps of:
   j) initiating a handover from said current cluster leader to said identified cluster leader, said identified cluster leader node becoming said current cluster leader; and
   k) sending a hello message from said current cluster leader.

17. The method as in claim 16, wherein said lower order cluster leaders include a secondary cluster leader and a tertiary cluster leader.

18. The method as in claim 17, wherein if said hello message is not received by said secondary cluster leaders after a maximum waiting period, said secondary cluster leader assumes current cluster leader and sends a second hello message.

19. The method as in claim 18, wherein if said second hello message is not received by said tertiary cluster leader after another maximum waiting period, said tertiary cluster leader assumes current cluster leader and sends a new hello message.

20. The method of organizing an ad hoc communications network as in claim 15, before the step (a) of selecting the NMS, said method further comprising the steps of:
   a1) providing operating environment parameters; and
   a2) tessellating an operating coverage area, the tessellated said operating coverage area indicating communication between said plurality of nodes;
   a3) identifying clustered nodes within the tessellated said operating coverage area.

21. A mobile communications station comprising:
   a wireless communications unit in a mobile communications node for connecting to other mobile communications stations;
   a storage unit in said mobile communications node storing network tables and matrices indicating wireless connectivity and connection to said other mobile communications stations; and
   an Artificial Neural Network (ANN) element in said mobile communications node trained to determine a cluster leader objective function value for each node in a cluster of a plurality of nodes, each said node being another mobile communications station, select a minimum value from determined said cluster leader objective function values, said mobile communications node being the cluster leader for said cluster whenever said minimum value corresponds to said mobile communications node, and wirelessly broadcast a cluster leader identity to said plurality of nodes in said cluster.

22. The mobile communications station as in claim 21, wherein said mobile communications node is trainable to hand off cluster leader whenever said minimum value corresponds to another node.

23. The mobile communications station as in claim 21, wherein said mobile communications node is trainable to selectively assume cluster leader whenever a previously identified said cluster leader fails to become cluster leader.

24. The mobile communications station as in claim 21, wherein said mobile communications station is coupled to an unmanned ground vehicle.

25. The mobile communications station as in claim 21, wherein said mobile communications station is coupled to an unmanned air vehicle.

26. A method of managing an ad hoc communications network comprising the steps of:
   a) determining a cluster leader objective function value for each network node in a cluster, said cluster having a plurality of network nodes;

b) providing each cluster leader objective function value to a current cluster leader identified for said cluster;

c) selecting a minimum value from provided cluster leader objective function values, the selected said value identifying a current cluster leader for said cluster and further selecting lower order cluster leaders from said plurality of network nodes; and when a new cluster leader is identified d) broadcasting the identity of the identified said cluster leader to said plurality of network nodes; and whenever, the identified cluster leader is a different network node than said current cluster leader, e) initiating a handover from said current cluster leader to said identified cluster leader, said identified cluster leader node becoming said current cluster leader; and f) sending a hello message from said current cluster leader, wherein if said hello message is not received by said lower order cluster leaders after a maximum waiting period, one of said lower order cluster leaders becomes current cluster leader and sends a new hello message.

27. The method as in claim 26, wherein if said second hello message is not received by remaining said lower order cluster leaders after another maximum waiting period, one of said remaining lower order cluster leaders becomes current cluster leader and sends a new hello message.

28. A method of organizing and managing an ad hoc communications network comprising the steps of:
   a) providing operating environment parameters for an ad hoc communications network; and
   b) tessellating an operating coverage area, the tessellated said operating coverage area indicating communication between said plurality of nodes;
   c) identifying clustered nodes within the tessellated said operating coverage area;
   d) selecting a Network Management System (NMS) from a plurality of nodes forming an ad hoc communications network, the node selected as said NMS including a neural network element and providing overall ad hoc communications network management;
   e) identifying nodes including a neural network element with a minimum cluster leader objective function value in each cluster of nodes in an operating coverage area, identified said nodes being selected as cluster leaders;
   f) providing training results to said each cluster of nodes; and
   g) monitoring connectivity within said each cluster of nodes for network changes in a cluster.

29. A method of managing an ad hoc communications network comprising the steps of:
   a) determining a cluster leader objective function value for each network node in a cluster, said cluster having a plurality of network nodes, wherein for each network node $(N_k(t))$ within Voronoi region k at time t, said cluster leader objective function value has the form $$F(D_{ik}(t), T_{ik}(t), N_k(t)) = \frac{C_0}{N_k(t)+1} + C_1 D_{ik}^2 + \frac{C_2}{T_{ik}^2},$$

where the coefficients, $C_0$ and $C_1$, are heuristically determined system parameters, $T_{ik}(t)$ is the link life between network node i and an imaginary node located at Voronoi prototype of region k, and $D_{ik}(t)$ is the Euclidean distance between position network node i and Voronoi prototype k at time t;

b) providing each cluster leader objective function value to a current cluster leader identified for said cluster;
   c) selecting a minimum value from provided cluster leader objective function values, the selected said value identifying a cluster leader for said cluster; and
   d) broadcasting the identity of the identified said cluster leader to said plurality of network nodes.

30. The method as in claim 29, wherein whenever, the identified cluster leader is a different network node than a current said cluster leader, said method further comprises the steps of:
   e) initiating a handover from said current cluster leader to said identified cluster leader, said identified cluster leader node becoming said current cluster leader; and
   f) sending a hello message from said current cluster leader.

31. A method of organizing and managing an ad hoc communications network comprising the steps of:
   a) selecting a Network Management System (NMS) from a plurality of nodes forming an ad hoc communications network, the node selected as said NMS including a neural network element and providing overall ad hoc communications network management;
   b) identifying nodes including a neural network element with a minimum cluster leader objective function value in each cluster of nodes in an operating coverage area, identified said nodes being selected as cluster leaders, wherein for each $(N_k(t))$ within Voronoi region k at time t, said cluster leader objective function value has the form $$F(D_{ik}(t), T_{ik}(t), N_k(t)) = \frac{C_0}{N_k(t)+1} \frac{C_1 D_{ik}}{T_{ik}},$$

where the coefficients, $C_0$, $C_1$ and $C_2$, are heuristically determined system parameters, $T_{ik}(t)$ is the link life between node i and an imaginary node located at Voronoi prototype of region k, and $D_{ik}(t)$ is the Euclidean distance between position node i and Voronoi prototype k at time t;

c) providing training results to said each cluster of nodes; and
   d) monitoring connectivity within said each cluster of nodes.

32. The method as in claim 31, wherein whenever the monitoring step (d) identifies network changes in a cluster, said method further comprises the steps of:
   e) determining said cluster leader objective function value for each node in said cluster;
   f) providing each cluster leader objective function value to a current cluster leader identified for said cluster;
   g) selecting a minimum value from provided cluster leader objective function values, the selected said value identifying a cluster leader for said cluster;
   h) selecting lower order cluster leaders from remaining nodes in said cluster; and
   i) broadcasting the identity of said cluster leader to said nodes in said cluster and to other said clusters.

* * * * *